United States Patent
Paris et al.

(10) Patent No.: US 10,282,369 B2
(45) Date of Patent: May 7, 2019

(54) FAST INDEXING AND SEARCHING OF ENCODED DOCUMENTS

(71) Applicant: Centri Technology, Inc., Seattle, WA (US)

(72) Inventors: Luis Gerardo Paris, Maple Valley, WA (US); Michael Patrick Mackey, Lake Stevens, WA (US)

(73) Assignee: Centri Technology, Inc., Seattle, WA (US)

( * ) Notice: Subject to any disclaimer, the term of this patent is extended or adjusted under 35 U.S.C. 154(b) by 0 days.

(21) Appl. No.: 15/453,853

(22) Filed: Mar. 8, 2017

(65) Prior Publication Data

US 2018/0260469 A1 Sep. 13, 2018

(51) Int. Cl.
| | |
|---|---|
| *G06F 16/00* | (2019.01) |
| *G06F 16/28* | (2019.01) |
| *G06F 21/60* | (2013.01) |
| *H04L 9/06* | (2006.01) |
| *G06F 16/248* | (2019.01) |
| *G06F 16/22* | (2019.01) |
| *G06F 16/31* | (2019.01) |
| *G06F 16/951* | (2019.01) |

(52) U.S. Cl.
CPC ........ *G06F 16/285* (2019.01); *G06F 16/2228* (2019.01); *G06F 16/248* (2019.01); *G06F 16/282* (2019.01); *G06F 16/31* (2019.01); *G06F 21/602* (2013.01); *H04L 9/0643* (2013.01); *G06F 16/951* (2019.01)

(58) Field of Classification Search
CPC .. G06F 16/2228; G06F 16/248; G06F 16/282; G06F 16/285; G06F 16/31; G06F 16/951; G06F 21/602
See application file for complete search history.

(56) References Cited

U.S. PATENT DOCUMENTS

| | | | |
|---|---|---|---|
| 2002/0102988 A1* | 8/2002 | Myllymaki | H04W 4/02 455/456.5 |
| 2003/0069880 A1* | 4/2003 | Harrison | G06F 17/30663 707/999.003 |
| 2006/0036593 A1* | 2/2006 | Dean | G06F 17/3061 707/999.004 |
| 2008/0319839 A1* | 12/2008 | Olliphant | G06Q 30/02 705/14.54 |

(Continued)

*Primary Examiner* — Dinku W Gebresenbet
(74) *Attorney, Agent, or Firm* — John W. Branch; Lowe Graham Jones PLLC

(57) ABSTRACT

Embodiments are directed to a searchable encryption model for fast indexing and searching of encoded documents. The encoded documents may have multiple encryption and/or compression layers applied. The model supports full or partial keywords and simple or complex queries. The index model may be based on prefix trees to optimize space and time complexities during indexing and searching. This index model can be used as the foundation to more complex search engines. Indexed documents may be tokenized and each token indexed in a prefix tree data structure, or trie index. Tokens in the index may be associated with a token catalog that includes information related to the documents that include the token. Token catalogs may be implemented as inverted indices that map tokens to documents. If a query is provided, a result set responsive to the query may be provided based on the token index and the token catalogs.

26 Claims, 11 Drawing Sheets

(56) References Cited

U.S. PATENT DOCUMENTS

| | | | |
|---|---|---|---|
| 2012/0262532 A1* | 10/2012 | Poon | H04N 7/15 348/14.02 |
| 2013/0110497 A1* | 5/2013 | Medero | G06F 17/27 704/9 |
| 2014/0041030 A1* | 2/2014 | Call | G06F 21/55 726/22 |

* cited by examiner

FAST INDEXING AND SEARCHING OF ENCODED DOCUMENTS

TECHNICAL FIELD

The invention relates generally to indexing documents, and more particularly, but not exclusively to indexing encrypted documents.

BACKGROUND

Searching through data has been a key feature of databases and information management systems since their inception. However, adding extra requirements to the search, such as data optimization, compression, and encryption introduce extra challenges and restrictions not only on the data, but also on the metadata required to index that data. In some cases, encryption or other encoding may make it difficult to search for particular data or documents. Thus, it is with respect to these considerations and others that the subject innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
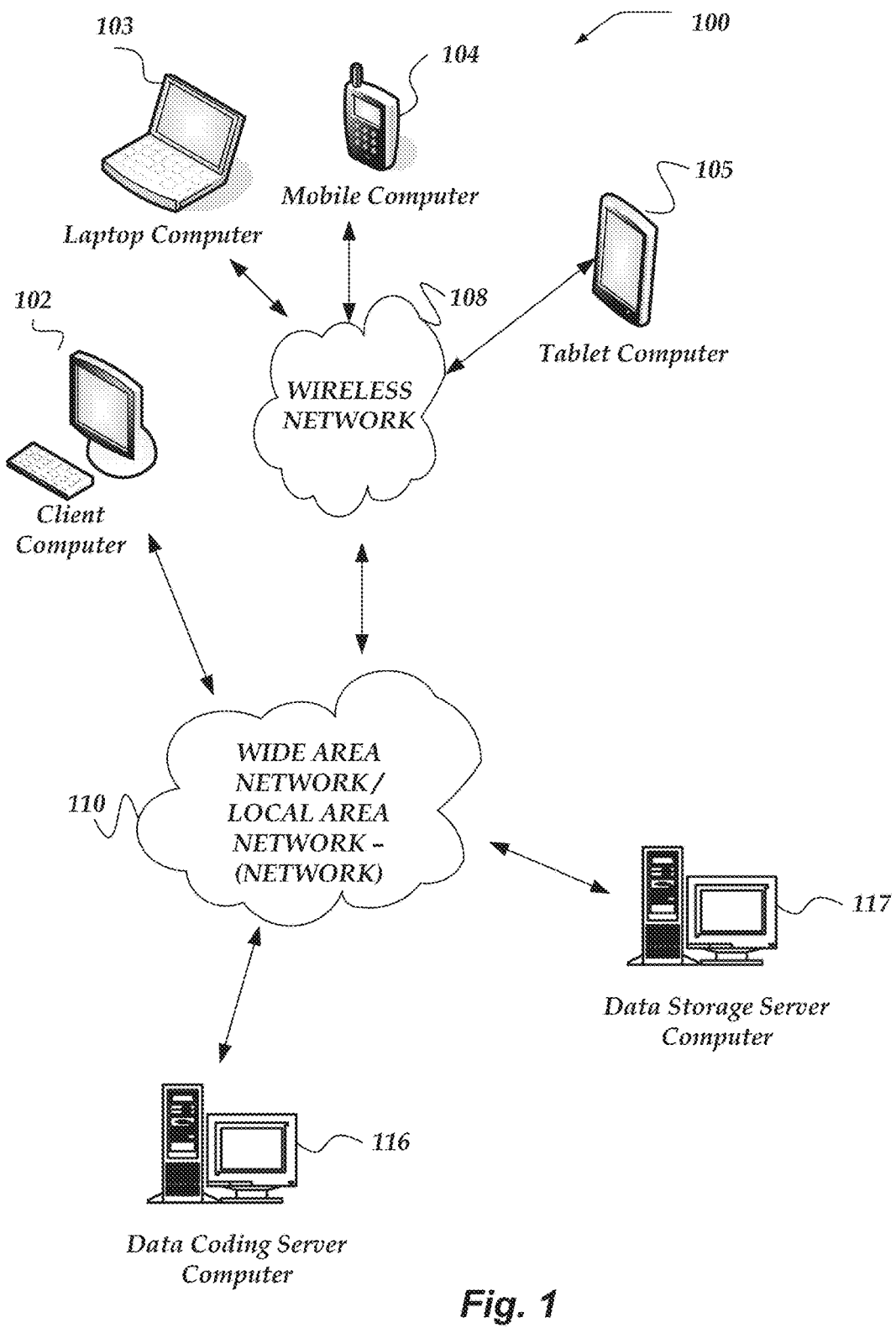
FIG. 1 is a system diagram of an environment in which embodiments of the invention may be implemented.

Various embodiments now will be described more fully hereinafter with reference to the accompanying drawings, which form a part hereof, and which show, by way of illustration, specific exemplary embodiments by which these innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, computers, or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Also, throughout the specification and the claims, the use of "when" and "responsive to" do not imply that associated resultant actions are required to occur immediately or within a particular time period. Instead they are used herein to indicate actions that may occur or be performed in response to one or more conditions being met, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, JAVA™, PHP, Perl, HTML, CSS, JavaScript, Ruby, VBScript, ASPX, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms, "encoding," and "decoding," refer to cryptographic operations that may be performed on data. Generally, encoding may refer to one or more cryptographic operations that may be performed on data to secure it for transmission and/or storage. In some cases, data may be encoded using public key/private key cryptography. In other cases, cryptographic operations may employ symmetric keys. Further, in some embodiments, operations such as compression or decompression may be employed before and/or after data is encoded or decoded. Accordingly, herein it is assumed that encoding, decoding, and cryptographic operations may include one or more additional steps such as compression, decompression, data padding, data seeding, or the like, or combination thereof.

As used herein "encoder" refers to a software library or hardware processor that is arranged to perform one or more data encoding operations. Encoding operations may include encryption, compression, or the like. Also, encoders may be arranged to perform one or more supporting operations, such as, executing cryptographic hash functions, providing random numbers (e.g., pseudo-random numbers or real-random numbers), cryptographic key management, generating shared secrets, cryptographic signing, cryptographic authentication, cipher negotiation, cipher management, or the like, or combination thereof. In some cases, encoders may be built-in to an encoding engine. In other cases, encoders may be separate from the encoding engine. For example, an encoding engine may be arranged to employ one or more encoders built into a hardware security module (HSM). In some embodiments, a single encoder may support more than one cipher suite. In some cases, the cipher suites employed by an encoder may be well-known or otherwise standards based. In other cases, cipher suites may include custom operations. Further, in some cases, encoders that support custom cipher suites may employ one or more well-known or standards based cryptographic operations (e.g., SHA2 hashing, or the like) as part of the custom cipher suite.

As used herein "decoder" refers to a software library or hardware processor that is arranged to perform one or more data decoding operations. Generally, the above definition for encoders applies to decoders except that decoders produce decoded data from encoded data. Further, in some cases, an encoder and a decoder may be part of the same software library or hardware device. In other cases, the encoder and decoder may be separate from each other. Also, decoders should support the same or similar cipher suites as used by the encoder that produce the encoded data.

As used herein "input stream" refers to a source of data that may be provided to an encoding engine for encoding. The term input stream represents the various facilities that may provide the data to an encoding engine, such as, file streams, file handles, network sockets, Unix domain sockets, Windows sockets, pipes, named pipes, message queues, shared buffers, file mappings, databases, distributed data stores, or the like, or combination thereof. For example, an input stream may present data from a very large file or a document file that is provided to an encoding engine using operating system file input/output facilities. Or, the input stream could present data provided by a network socket connected to a remote data source. Herein, for brevity and clarity all sources of data provided to the encoding engine are referred to as input streams.

As used herein the term "document" refers to a quantum of data that may be provided to an indexing engine and indexed. Accordingly, documents may include, work processing files, email messages, text files, database files, audio files, image files, video files, mixed media files, log files, event files, portable document format files (PDFs), or the like. Documents may be provided or stored discretely. Also, documents may be provided as part of a stream of data. Some documents may be arranged use well-known or discoverable formats.

As used herein the term "token" refers to words, phrases, symbols, meaningful data blocks, other meaningful elements, or the like, are included in a documents. For example, if the document is an English language text documents, the tokens may be the English language words included in the document. A program or process may be employed to tokenize a document to discover the tokens that are included in the document. Tokenizers may be arranged or customized to support different languages, lexicons, or the like. Also, tokenizers may be paired with configuration information such as, exclusion lists, inclusion lists, language models, or the like, that may be applied when tokenizing a document. For example, an exclusion list may include a list of tokens, such as, A, IN, THE, AN, or the like, that should not be considered tokens for the purpose of token indexing even though they are discoverable by the tokenizer.

As used herein the term "token element" refers the elements that make up a token. If a token is an English word, each token element is a letter. Likewise, if the token is a number, each token element may be a numeral. Token elements comprise a defined set of symbols and may be considered an alphabet such that the tokens in the indexed documents are comprised of a known set of token elements. The token element set is not constrained to standard alphabets and may be arranged to include combinations of letters, numbers, symbols, or the like, that are relevant for the documents being indexed.

As used herein the term "token information" refers to information describing a token with respect to a particular document. Token information may include information, such as, document name, document location, token counts, token position (e.g., offsets) in the un-encoded document, token position in the encoded document, or the like, or combination thereof. Token information may be discovered or generated during the tokenization of a document during indexing. Also, in some cases, some token information may be generated during encoding or decoding of a document. The token information may include metrics associated with a given token with respect to the document it was found in. Metrics may include counts, distribution information, frequency information, or the like, Also, the token information may include position information that indicates the location of the token within the document. Thus, if a token was found in the document multiple times, there may be more than one position for a token.

As used herein the term "token index" refers to a data structure that indexes tokens. The token index is arranged to efficiently determine if a token is included in one or more of the indexed documents. If a given token is not found in the token index, the indexed documents do not include that token. In some embodiments, token indices may be encrypted or encoded using the same encoding used for encoding documents, or in some cases, a different encoding may be used.

As used herein the term "token catalog" refers to an object or data structure that includes information regarding which indexed documents include a particular token. Each indexed token may have a corresponding token catalog. A token catalog for a given token includes token information for each indexed document that includes the token. In some embodiments, token catalogs may be encrypted or encoded using the same encoding used for encoding documents, or in some cases, a different encoding may be used.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards indexing encoded documents to enable them to be searched or queried without having to decode the contents of the documents.

Accordingly, the innovation described herein provide a searchable encryption model that enables for fast indexing and searching over encrypted documents and/or compressed documents.

In one or more of the various embodiments, performance may be improved by avoiding parsing each document during a search which would otherwise be inefficient for most practical scenarios. Accordingly, in one or more of the various embodiments, an indexing engine builds an index of the documents. Then this index may be available to respond to queries provided by various applications such as a search engine.

In one or more of the various embodiments, if documents have been encoded before indexing, they may be decoded and indexed on-the-fly. In some embodiments, if documents are un-encoded, they may be indexed as they are encoded by the indexing engine.

In one or more of the various embodiments, the indexing model may be based on a prefix tree data structure (e.g., trie index) that enables easier prefix searches (e.g., stemming) and improves space optimization by at least prefix sharing. Each token represented in the trie index may be associated with a token catalog that includes information related to the documents that include the token. In some embodiments, token catalogs may be considered inverted indices that map tokens to documents.

In one or more of the various embodiments, various applications may provide queries that are searching for documents or documents information related tokens included in the query. Accordingly, in some embodiments, a search engine application may scan the trie index for the relevant tokens. If matches are found, the trie index will identify relevant token catalogs. Thus, the token catalogs may be used to provide result set information, such as document names, document location, number of matches, offset of tokens in the matching documents, or the like, or a combination thereof.

Accordingly, in one or more of the various embodiments, if a document is provided, an indexing engine may be employed to perform additional action as described below.

In one or more of the various embodiments, a plurality of tokens included in the document may be provided by tokenizing the content of the document.

In one or more of the various embodiments, if one or more of the tokens are absent from a token index, the tokens absent from the token index may be indexed in the token index. In one or more of the various embodiments, indexing the one or more tokens, may include providing one or more token elements from each of the one or more tokens. Accordingly, in one or more of the various embodiments, if the one or more token elements are absent from a portion of the token index that corresponds to the token element, the token element may be added to the portion of the token index that corresponds to the token element. And, in one or more of the various embodiments, if a previously absent token is indexed in the token index, a token catalog that corresponds to the previously absent token may be provided.

In one or more of the various embodiments, token information may be provided based on the tokens found in the document, such that the token information includes one or more values that indicate the position of each position of the tokens included in the document. In one or more of the various embodiments, the token information, may include, one or more of, a document identifier, a count for the number of times an individual token appears in a particular document, position values that correspond to each occurrence of the same token that appears multiple times in the document, or the like.

In one or more of the various embodiments, the token information may be added to one or more token catalogs, such that each token catalog may be associated with a separate token.

In one or more of the various embodiments, the document may be encoded and the encoded document may be stored in a data store.

In one or more of the various embodiments, if a query is provided, a result set responsive to the query may be provided based on the token index and the one or more token catalogs. In one or more of the various embodiments, providing the result set may further include: providing one or more query tokens based on the query; individually comparing the one or more query tokens to the token index based on one or more token elements of the one or more query tokens; and if the comparison of the one or more token elements provides an affirmative result that indicates one or more of the provided query tokens are indexed by the token index, further actions may be performed to process the query. Accordingly, in one or more of the various embodiments, one or more of the token catalogs may be provided based on the affirmative result of the comparison, such that the one or more provided token catalogs may correspond to a query token that may be indexed by the token index. In one or more of the various embodiments, token information from the one or more provided token catalogs may be provided based on the affirmative result of the comparison. And, in some embodiments, the result set may be provided based on the token information, such that the result set includes one or more lists of documents.

In one or more of the various embodiments, providing the query may include, providing, one or more of, one or more query tokens, one or more logical operators, one or more precedence operators, one or more sorting directives, one or more grouping directives, or the like.

In one or more of the various embodiments, a token element set may be provided. In one or more of the various embodiments, a trie or prefix tree that is arranged based on the token element set may be provided. In one or more of the various embodiments, the token index may be provided based on the actual trie state.

In one or more of the various embodiments, mapping information that maps one or more document identifiers included in each of the one or more token catalogs to one or more documents may be provided, such that the mapping information may be stored separate from the one or more token catalogs.

Illustrated Operating Environment

FIG. 1 shows components of one embodiment of an environment in which embodiments of the invention may be practiced. Not all the components may be required to practice the invention, and variations in the arrangement and type of the components may be made without departing from the spirit or scope of the invention. As shown, system 100 of FIG. 1 includes local area networks (LANs)/ wide area networks (WANs)—(network) 110, wireless network 108, client computers 102-105, data coding server computer 116, data storage server computer 117, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), universally unique identifiers (UUIDs), or other device identifiers. Such information may be provided in a network packet, or the like, sent between other client computers, data coding server computer 116, data storage server computer 117, or other computers.

Client computers 102-105 may further be configured to include a client application that enables an end-user to log into an end-user account that may be managed by another computer, such as data coding server computer 116, data storage server computer 117, or the like. Such an end-user account, in one non-limiting example, may be configured to enable the end-user to manage one or more online activities, including in one non-limiting example, project management, software development, system administration, data modeling, search activities, social networking activities, browse various websites, communicate with other users, or the like. Also, client computers may be arranged to enable users to display reports, interactive user-interfaces, and/or results provided by data coding server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, data coding server computer 116, data storage server computer 117, client computers 102-105 through wireless network 108, or the like.

Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of data coding server computer 116 is described in more detail below in conjunction with FIG. 3. Briefly, however, data coding server computer 116 includes virtually any network computer that is specialized to provide encoding and decoding services, including indexing encoded documents, as described herein.

Although FIG. 1 illustrates data coding server computer 116 and data storage server computer 117 as single computers, the innovations and/or embodiments are not so limited. For example, one or more functions of data coding server computer 116, data storage server computer 117, or the like, may be distributed across one or more distinct network computers. Moreover, data coding server computer 116 and data storage server computer 117 are not limited to a particular configuration such as the one shown in FIG. 1. Thus, in one embodiment, data coding server computer 116 and data storage server computer 117 may be implemented using a plurality of network computers. In other embodiments, server computers may be implemented using a plurality of network computers in a cluster architecture, a peer-to-peer architecture, or the like. Further, in at least one of the various embodiments, data coding server computer 116 and data storage server computer 117 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
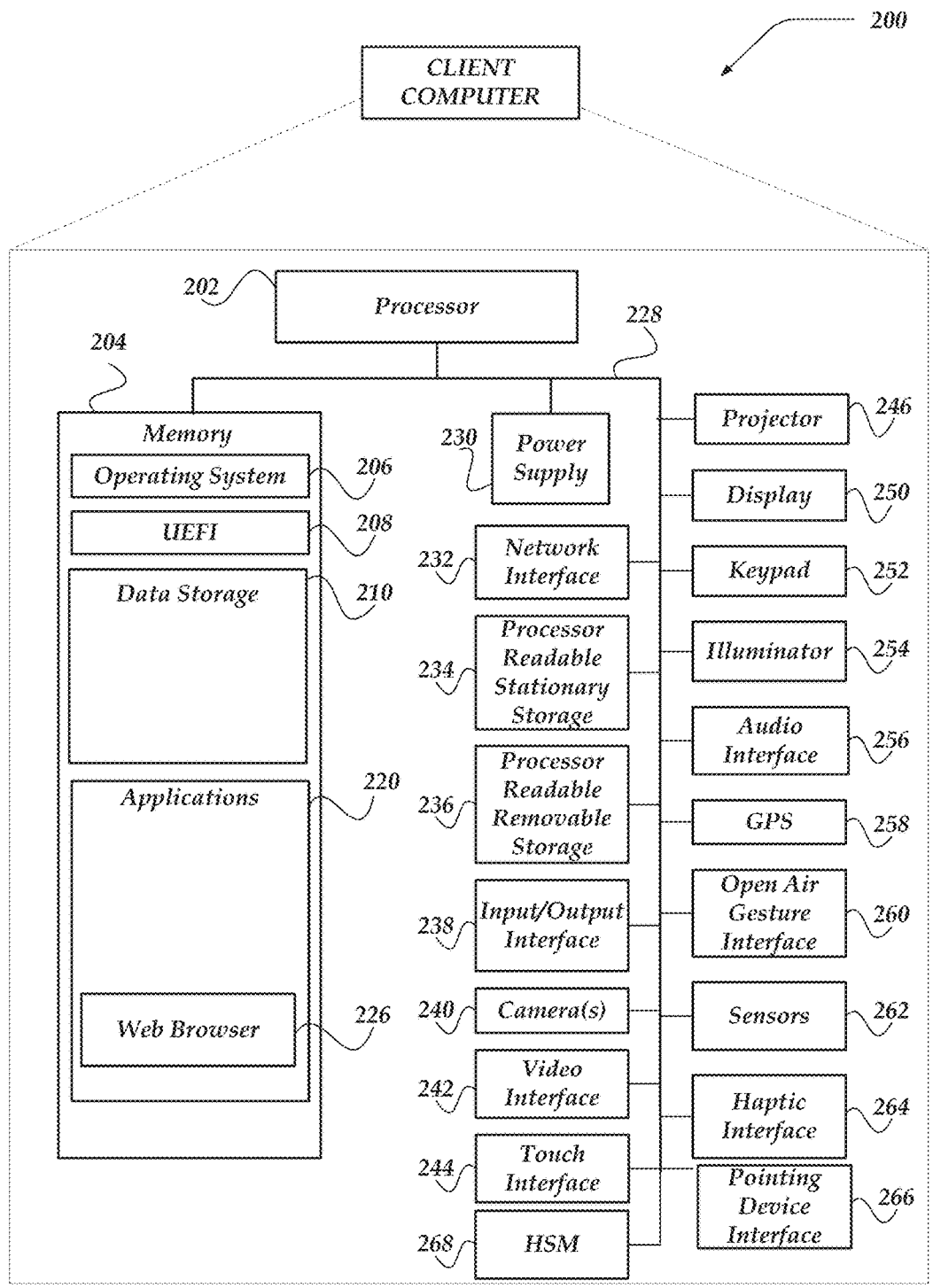
FIG. 2 shows an embodiment of a client computer that may be included in a system such as that shown in FIG. 1.

FIG. 2 shows one embodiment of client computer 200 that may include many more or less components than those shown. Client computer 200 may represent, for example, at least one embodiment of mobile computers or client computers shown in FIG. 1.

Client computer 200 may include one or more processors, such as processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope, accelerometer, or the like may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, electronic paper, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images. Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, Bluetooth Low Energy. or the like. Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

In at least one of the various embodiments, applications, such as, flow execution engine 222, web browser 226, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 258. Also, in some embodiments, geolocation information may include information provided using one or more geolocation protocols over the networks, such as, wireless network 108 and/or network 111.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™, Bluetooth Low Energy, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store Unified Extensible Firmware Interface (UEFI) 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Apple® IOS®, Windows Phone™. The operating system may include, or interface with a Java and/or JavaScript virtual machine modules that enable control of hardware components and/or operating system operations via Java application programs or JavaScript programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, user credentials, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. Also, in one or more embodiments (not shown in the figures), the client computer may include one or more hardware microcontrollers instead of one or more CPUs. In at least one embodiment, the microcontrollers be system-on-a-chips (SOCs) that may directly execute their own embedded logic to perform actions and access their own internal memory and their own external Input and Output Interfaces (e.g., hardware pins and/or wireless transceivers) to perform actions.

Illustrative Network Computer

Figure 3:
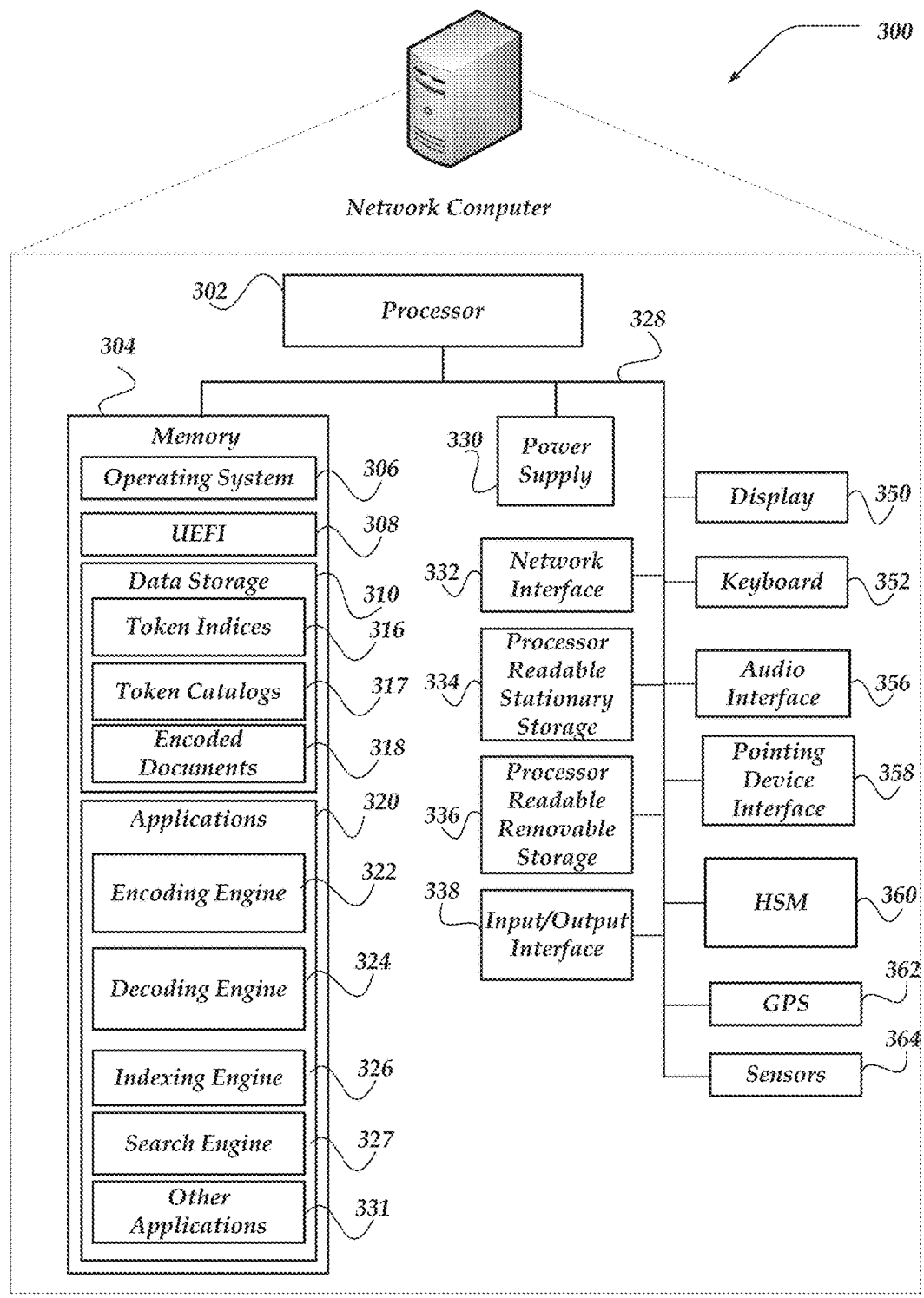
FIG. 3 shows an embodiment of a network computer that may be included in a system such as that shown in FIG. 1.

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of modeling platform server computer 116 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300. In some embodiments, processor 302 may be a multiprocessor system that includes one or more processors each having one or more processing/execution cores.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300.

In one or more of the various embodiments, sensors 364 may be arranged to provide one or more signals used for generating entropy that may be used for generating improved or optimized random numbers (e.g., random number seeds) that may be used for encryption or secure key generation. Accordingly, signal and/or data from these sensors may be captured and employed for generating randomness for used in the encoding protocols.

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of non-transitory computer readable and/or writeable media. Memory 304 illustrates an example of computer-readable storage media (devices) for storage of information such as computer-readable instructions, data structures, program modules or other data. Memory 304 stores a unified extensible firmware interface (UEFI) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by one or more processors, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, token indices 316, token catalogs 317, encoded documents 318, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include encoding engine 322, decoding engine 324, indexing engine 326, search engine 327, other applications 331, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, encoding engine 322, decoding engine 324, search engine 326, or the like, may be arranged to employ geolocation information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 362. Also, in some embodiments, geolocation information may include information provided using one or more geolocation protocols over the networks, such as, wireless network 108 and/or network 110.

Likewise, in one or more of the various embodiments, encoding engine 322 may be arranged to collect one or more signals used for generating entropy that may be used for to optimize of improved the generation of random numbers (e.g., random number seeds) that may be used for encryption or secure key generation. Accordingly, in some embodiments, encoding engine 322 may be arranged to employ signals or data provided by sensors 364 or HSM 360 for generating randomness for used in the encoding protocols.

Furthermore, in at least one of the various embodiments, encoding engine 322, decoding engine 324, indexing engine 326, search engine 327, other applications 331, may be operative in a cloud-based computing environment. In at least one of the various embodiments, these engines, and others, that comprise the modeling platform that may be executing within virtual machines and/or virtual servers that may be managed in a cloud-based based computing environment. In at least one of the various embodiments, in this context applications including the engines may flow from one physical network computer within the cloud-based environment to another depending on performance and scaling considerations automatically managed by the cloud computing environment. Likewise, in at least one of the various embodiments, virtual machines and/or virtual servers dedicated to encoding engine 322, decoding engine 324, indexing engine 326, search engine 327, other applications 331, may be provisioned and de-commissioned automatically.

Further, in some embodiments, network computer 300 may also include hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

In one or more of the various embodiments, HSM 360 may be arranged to collect one or more signals used for generating entropy that may be used for generating random numbers (e.g., random number seeds) that may be used for encryption or secure key generation. Accordingly, signal and/or data collected by HSM 360 may be employed for optimizing or improving one or more encoding protocols used by the encoding engine by improving randomness. In some embodiments, HSM 360 may receiving signals from sensors 364 or it may be arranged to include its own signal sensors for generating entropy.

Additionally, in one or more embodiments (not shown in the figures), network computer 300 may include one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In at least one embodiment, the one or more microcontrollers may directly execute embedded logic to perform actions and access their own internal memory and their own external Input and Output Interfaces (e.g., hardware pins and/or wireless transceivers) to perform actions. E.g., they may be arranged as Systems On Chips (SOCs).

Illustrative Logical System Architecture

Figure 4:
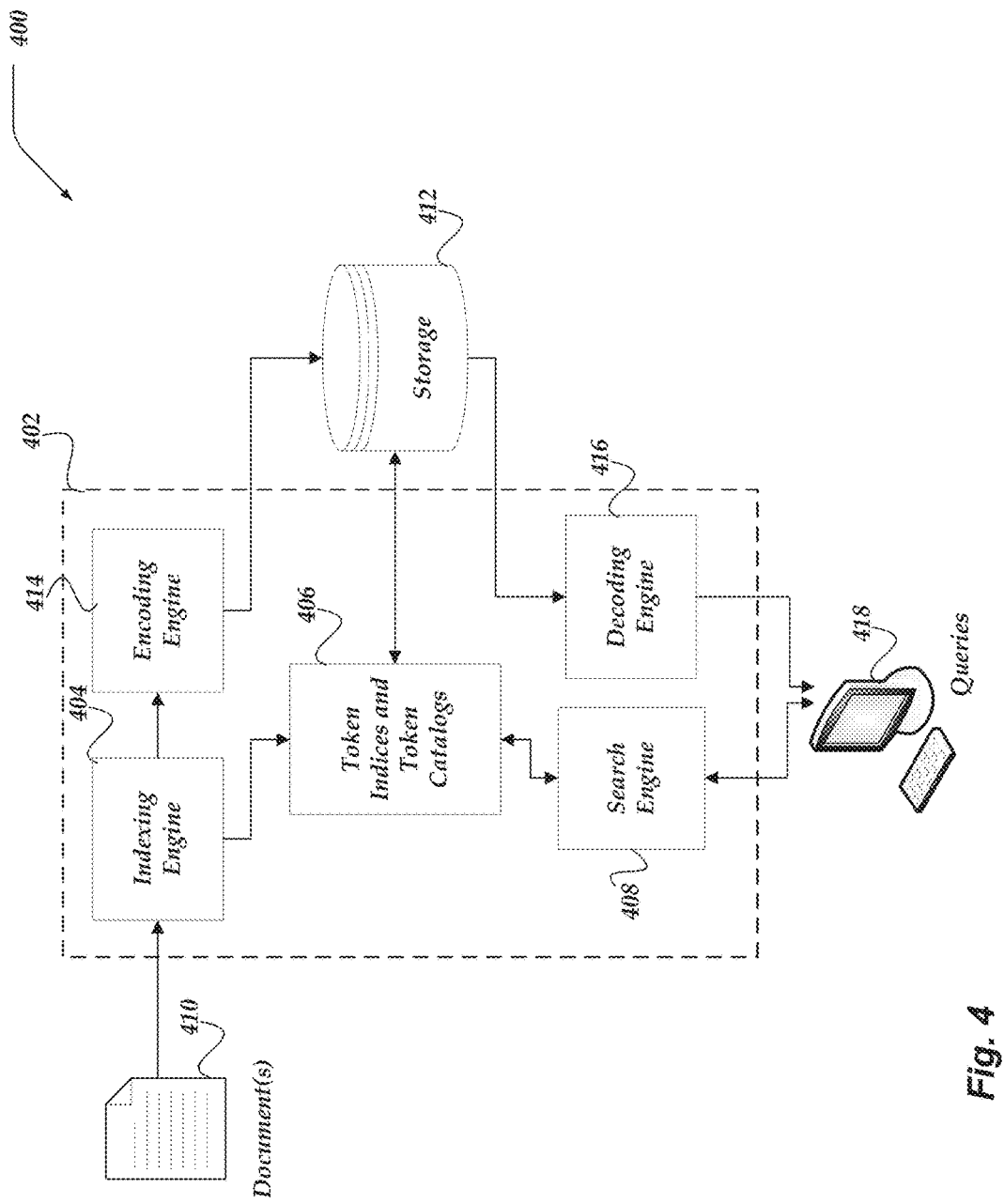
FIG. 4 illustrates a logical schematic of a system that is arranged for indexing encoded documents in accordance with at least one of the various embodiments.

FIG. 4 illustrates a logical schematic of system 400 that is arranged for providing indexing encoded documents in accordance with at least one of the various embodiments. In one or more of the various embodiments, a data coding server computer, such as data coding server computer 116 may be arranged to encode or decode data. In one or more of the various embodiments, server 402 represents how some or all components may be included in one or more server computers such as data coding server computer 116.

In one or more of the various embodiments, system 400 may include indexing engine 404, indices 406, search engine 408, encoding engine 414, decoding engine 416, or the like. Also, system 400 may include one or more documents, such as documents 410 that may be submitted for indexing. Encoded documents may be stored in a storage location such as storage 412.

In one or more of the various embodiments, documents 404 may be provided to indexing engine 404. In one or more of the various embodiments, indexing engine 404 may be arranged to tokenize incoming documents to generate token indices and one or more token catalogs. Token indices and token catalogs 406 may be stored or otherwise made available to search engine 408.

In one or more of the various embodiments, each index of encoded documents includes one token index and one or more token catalogs. Each token may have at least one corresponding token catalog. For example, in some embodiments, if document collection has one hundred documents, it may have one token index and over a thousand token catalogs—one token catalog for each individual token.

In one or more of the various embodiments, indexing engine 404 may be arranged to employ a tokenizer that may be configurable. Accordingly, the tokenizer may be optimized for different languages, lexicons, subject matter, formats, or the like. In many cases, the tokenizer may be arranged to include one or more lists of tokens that may be excluded. For example, an English language tokenizer may be arranged to exclude some small English words, such as in, a, an, the, is, or the like.

In one or more of the various embodiments, if documents 410 are indexed, encoding engine 414 may be arranged to encode the documents and store in a data store, such as storage 412.

In one or more of the various embodiments, client 418 may be arranged to provide queries to system 400. In some embodiments, client 418 represents one or more user-interfaces, applications, or processes that may be running on a separate computer. In other embodiments, client 418 may represent one or more user-interfaces, applications, or processes running on a data coding server computer.

In one or more of the various embodiments, search engine 408 may be arranged to receive queries based on tokens. In one or more of the various embodiments, queries may be arranged to include multiple expressions, meta-language, or the like, or combination thereof. In some embodiments, query planner engine (not shown) may be arranged to process queries to validate them and/or re-configured to into partial/sub queries that may be consumed by the search engine.

In one or more of the various embodiments, search engine 408 may be arranged to lookup tokens (provided by the query) using the appropriate token index. And, if relevant tokens are found in the token index, their corresponding token catalogs may be determined. Accordingly, in some embodiments, token information relevant to the search may be provided from the token catalogs. In some embodiments, partial queries may be expanded to full queries containing the actual tokens from the token index, simply by expanding all tokens that stem from the prefix trie index.

In one or more of the various embodiments, there may be a separate token catalog for each token included in the token index. In some embodiments, token catalogs may be arranged to include a list of all of the documents that include one or more instances of the token. Also, token catalogs may be arranged to include other token information, such as, document name, document location, token counts, token position (e.g., offsets) in the un-encoded document, token position in the encoded document, or the like, or combination thereof.

In one or more of the various embodiments, some or all of the relevant token information resulting from the query may be provided to a client application. In some embodiments, there may be one or more post-processing engines (not shown) that may be arranged to perform various post-processing actions, such as sorting, grouping, counting, comparing, the result sets or partial result sets provided by search engine 408 before they are provided to the client.

In one or more of the various embodiments, if encoded documents need to be decoded, decoding engine 416 may be arranged to decode documents upon request. For example, a client may provide for a query searching for encoded documents that include the token "apple". Accordingly, in this example, search engine 408 may provide a list of documents that include at least on instance of the token "apple."

In one or more of the various embodiments, the client may then decide what to do with this information. For example, the client may be arranged to retrieve a decoded copy of each file. Thus, in one or more of the various embodiments, decoding engine 416 may be employed to decode the one or more documents and provide them to the client.

In one or more of the various embodiments, there may be one token index per document collection. The selection of how to group documents into collection is up to the client applications that may be employing system 400 for encoding and indexing. For example, if the documents are part of an email storage system that keeps all email messages encoded, a separate token index may be provided for each user. Accordingly, a user may search their own email storage. Moreover, on email systems that store multiple email messages per document, the client application may implement additional abstraction layers to create a virtual separation of each message within its containing document. This would enable each message to be indexed independently.

In one or more of the various embodiments, more than one trie index may index portions of the same document collection. For example, an individual user may index their "own" documents separately even if the documents already are included in a companywide-index.

Figure 5:
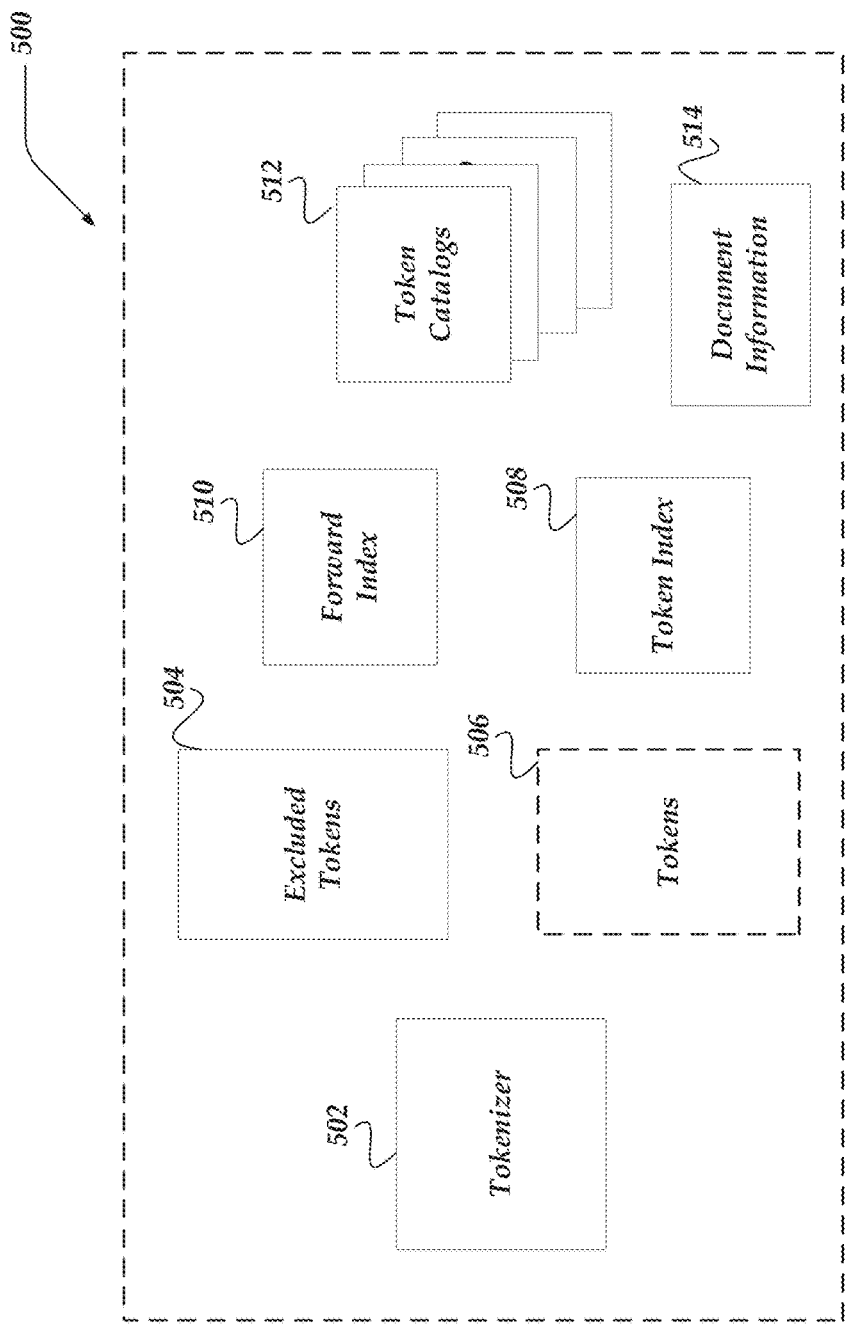
FIG. 5 illustrates a logical architecture of a system for indexing encoded documents in accordance with one or more embodiments.

FIG. 5 illustrates a logical architecture of system 500 for indexing encoded documents in accordance with one or more embodiments. In one or more of the various embodiments, system 500 may include tokenizer 502, excluded tokens 504, tokens 506, token index 508, forward index 510, token catalogs 512, or the like. In one or more of the various embodiments, tokens 506 may be separately stored in memory during the tokenization of a documents. In some embodiments, if the token information associated with tokens 506 is added to the index, tokens 506. may be deleted or overwritten.

In one or more of the various embodiments, the contents of excluded tokens 504 may be configurable. For example, in some embodiments, excluded tokens 504 may be a list of English words that should be excluded from token index 508.

In one or more of the various embodiments, token index 508 may be a data structure that contains an index of tokens that may be searched using one or more elements of a token. For example, if the tokens are English words, then index 508 may be arranged to be incrementally searchable by letters of the English alphabet that comprise the tokens. Each indexed token will include a pointer to its corresponding token catalog. Thus, in one or more of the various embodiments, if tokens in a query are matched, a pointer or reference to its corresponding token catalog may be provided. In some embodiments, index 508 may be arranged to use a trie data structure that enables fast searching and shared token prefixes.

In one or more of the various embodiments, system 500 may be arranged to include a forward index, such as forward index 510, this index may be arranged to associate documents to tokens. It may be arranged to include a list that associates each indexed document with a list of tokens and token information.

In one or more of the various embodiments, one or more token catalogs, such as token catalogs 512 may be generated. One token catalog may be provided for each token. As mentioned above, and discussed in more detail below, token catalogs include a list of indexed documents and token information for each indexed document.

In one or more of the various embodiments, document information 514 may be a data structure arranged to reduce the data size of some of the other indices or catalogs in system 500. In some embodiments, document information 514 may be arranged to map a size efficient identity value to other document information, such as document name, document location, or the like. In one or more of the various embodiments, absent document information 514, the name and/or location of the documents would have to be included in the token catalogs which would consume additional data storage space.

Figure 6:
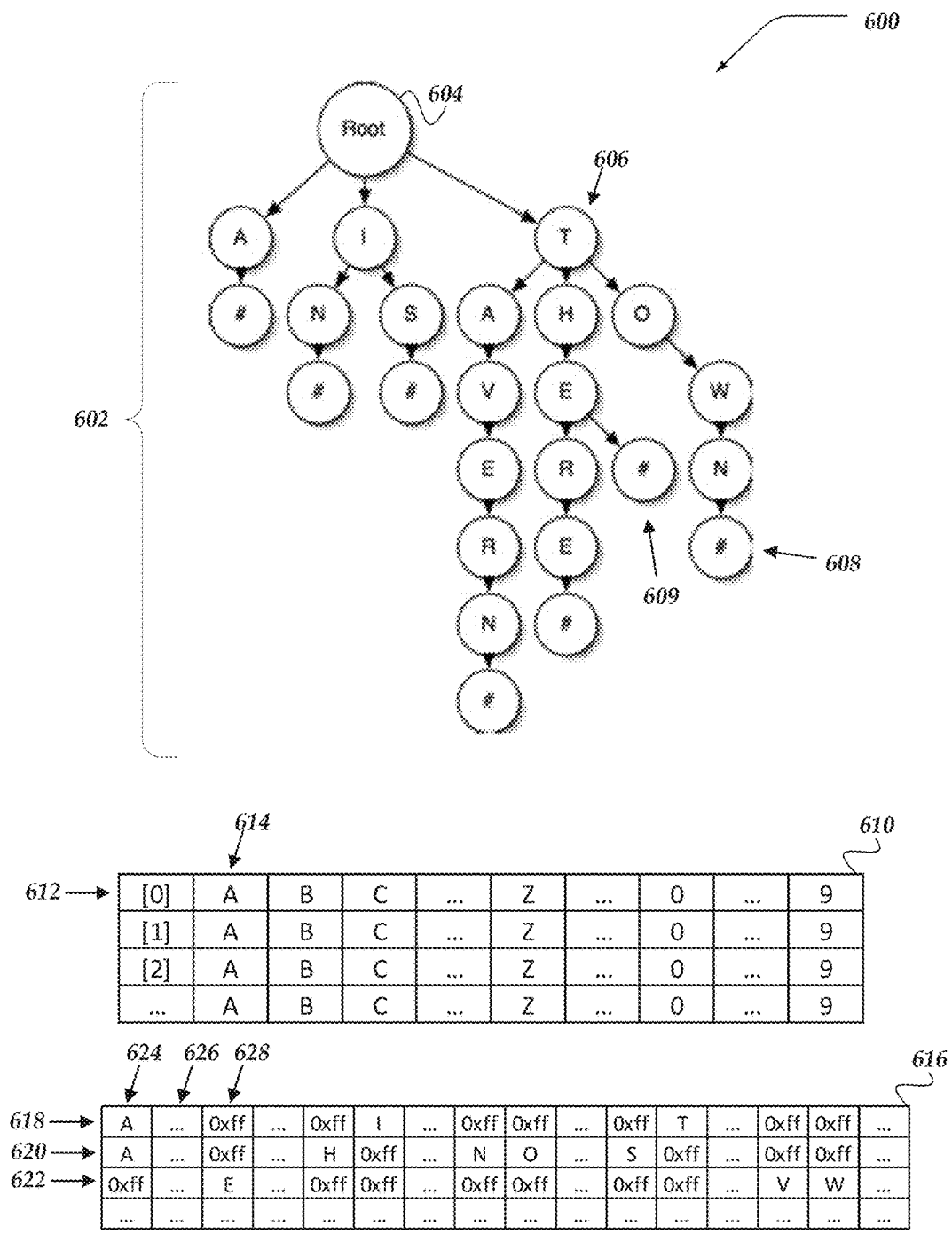
FIG. 6 illustrates a logical architecture of a token index for representing indexing tokens in accordance with one or more of the various embodiments.

FIG. 6 illustrates a logical architecture of token index 600 for representing indexing tokens in accordance with one or more of the various embodiments. In one or more of the various embodiments, token indices may be arranged to be trie data structures, such as trie 602. In this example, tie 602 is a prefix tree stores the tokens: a, in, is, tavern, the, there, to, and town. Trie 602 saves storage space and working memory by storing tokens and token elements that are prefixes common to other tokens once. Also, in one or more of the various embodiments, trie based indices offer the advantage that both indexing and searching has linear time complexity. That is, it takes roughly O(n) steps to index and search a token, where n is the number of elements in the token.

In one or more of the various embodiments, a search engine may be arranged to scan an index such as trie 602 to find tokens. For example, to look for indexed documents that include the token 'town', the search engine may take the first element of the token, 'T' in this case, and starting from root node 604 scan the first row of nodes looking for a match for 'T'. If 'T' is matched (e.g., by node 606), the next level of trie 602 is scanned for token element, 'O' If 'O' is found, the rest of the elements are tested until the token 'TOWN' is match at node 608. In this example, token TOWN is terminated at node 608 without any subsequent nodes available. In comparison, note the node 609 terminates the token THE which is a prefix of the token THERE which it is embedded. This illustrates prefix sharing where token THE and token THERE share the prefix THE. Accordingly, trie 602 reduces the memory footprint of the token index by sharing prefixes.

In one or more of the various embodiments, node 608 or node 609 represent pointers or references to the token catalogs that correspond to particular token. Thus, in this example, a value of node 608 references the token catalog for token TOWN while a value of node 609 references the token catalog for token THE.

In one or more of the various embodiments, trie 602 is a logical representation of a token index. In one or more of the various embodiments, trie 602 may be represented in memory using a data structure, such as array 610. In this example, assume token are limited to English words and numbers. Accordingly, in this example, a row such as row 612 may include enough elements to hold a complete English alphabet (upper case only), numerals 0-9, or the like. Further, in some embodiments, each row of array 610 may represent a row or level of trie 602. In this example, trie has six levels of token elements so a corresponding array data structure, such as array 610 may have six rows. Thus, in one or more of the various embodiments, representing trie 602 using array data structures improves the performance of operations that manipulate trie 602. In some embodiments, array 610 or array 616 may arranged such that their array elements are stored in contiguous memory. Accordingly, in some embodiments, operations, such as, seeking, inserting, deleting, or the like, may be optimized by using high-performant memory pointer operations or pointer math, or the like. For example, in some embodiments, seeking to the fourth position of array 610 may be accomplished by taking a pointer to memory p, that references the beginning of the array and adding four to it (e.g., p=p+4). Likewise, in some embodiments, clearing or setting an element of trie 602 via an array may be accomplished using performant pointer operations rather than the other slower system calls. In one or more of the various embodiments, array 616 represent an index configured to correspond to a portion of trie 602. In this example, row 618 corresponds to the first level of trie 602. Thus, it includes to three values, A, I, and T.

Elements associated with a token element such as row 618 row 624 may contain a reference to a token catalog if a token is matched at that element. In some embodiments, the value of the token may be inferred from its position in the array row. For example, here the first position of each row may be assumed to represent the letter A. Likewise, the second position (not shown) may be inferred to correspond to the letter B, and so on. Thus, rather than the actual token element value being recorded at the element, the element cell/node may be flagged or marked to indicate that the token element is part of the index. In one or more of the various embodiments, the trie data structure may be initialized to zeroes and the actual token element values are stored on each element to distinguish between an empty element and also to improve search performance. Also, if the element cell corresponds to a matched token, the array element may include additional data such as a pointer or reference to a token catalog.

In one or more of the various embodiments, empty elements of array 616 intervening between indexed token elements may be marked or tagged as empty such as element 628. Also, here elements, such as element 626 represent elements not included in this example so they are omitted.

In this example, for one or more of the various embodiments, row 620 corresponds to the second level of trie 602 (e.g., A, H, N, O, and S). Likewise, row 622 corresponds to the third level of trie 602 (e.g., E, V, and W).

In one or more of the various embodiments, data structure 610 may be arranged to account for letter/token frequency, encoding/encryption of the index, number/type of token elements, language, or the like, or combination thereof.

Likewise, one of ordinary skill in the art will appreciate that token indices such as trie 602, index 610, and index 616 are not limited to being graphs or table/tabular format. One of ordinary skill in the art will appreciate that token indices may be arranged differently using different formats, data structures, objects, columns, or the like, without departing from the scope of these innovations. For example, a token index such as array 610 could be represented in memory as a one-dimensional array rather than a two-dimensional array.

Figure 7:
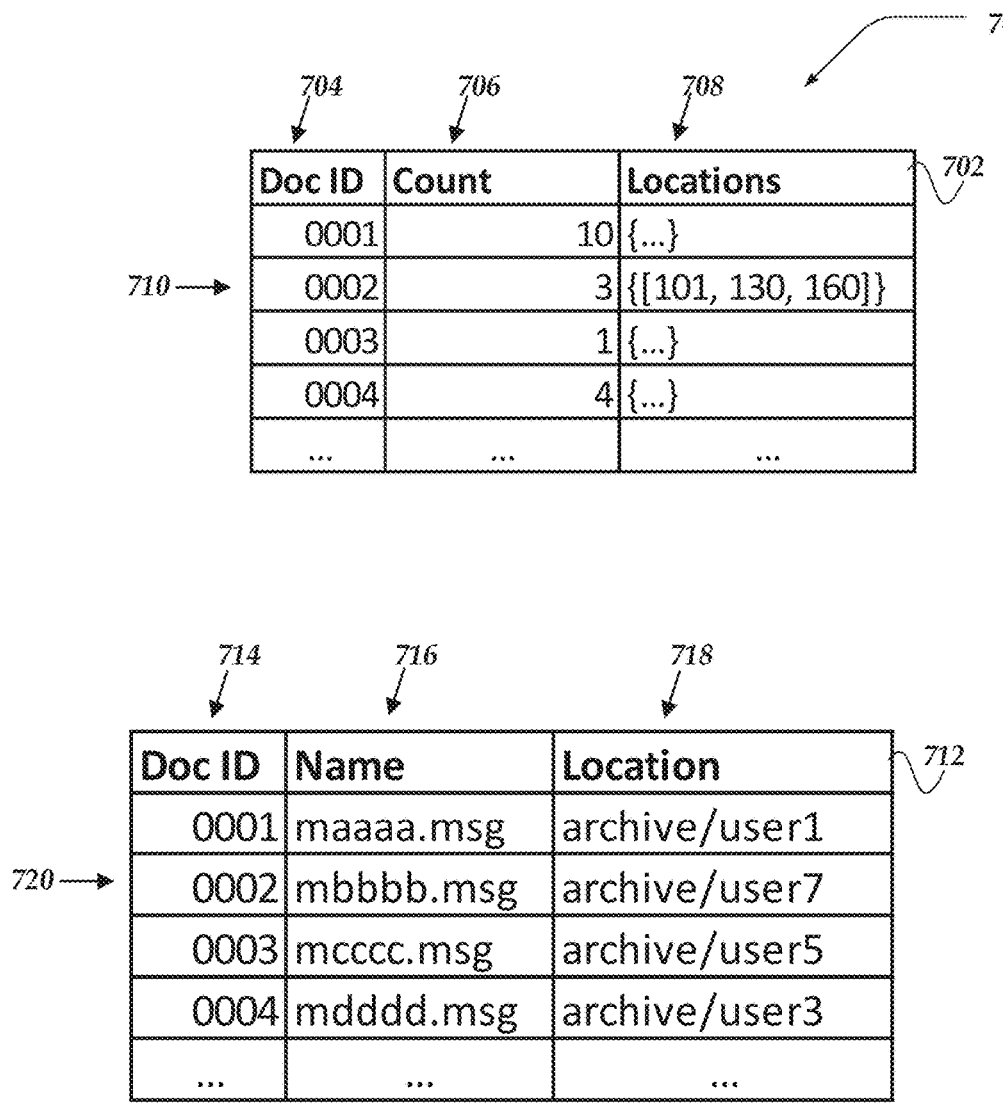
FIG. 7 illustrates a logical architecture for a system for representing token catalogs and document information indices in accordance with one or more of the various embodiments.

FIG. 7 illustrates a logical architecture for system 700 for representing token catalogs and document information indices in accordance with one or more of the various embodiments. Briefly, for some embodiments, catalog 702 represents a token catalog. In this example, it includes token information for each document that include one token. In this example, token information includes a document identifier (column 704), token hit count (column 706), and location information (column 708). In this example, column 704 includes values that correspond to entries in document information index 712. Column 706 represents the number of times the token corresponding the token catalog is found in the document. And, column 708 includes the position information describing where the token is located in the un-encoded version of the document. It may include offset values, or the like. Also, in some cases, token location information may include position information describing where in the encoded document the token may be located. Accordingly, in this example, if the token catalog is for the token APPLE, row 710 shows that document 0002 includes the token APPLE at three places.

In one or more of the various embodiments, as mentioned above, the storage/memory footprint of the token catalogs may be reduced by using document information indices, such as document information index 712. In this example, document information index 712 maps document identifiers with document information, such as, document name, storage locations, or the like. In this example, row 720 corresponds to document ID 0002. Thus, by referencing document information index 712, the information for document ID 0002 may be provided. In this example, document information index 712 include document ID (column 714), document name (column 716), and document location (column 718). Here, location may be considered the file system path where the document is located. In some embodiments, location may be a reference or key to another database where the encoded document may be stored. Also, in other embodiments, location may be a reference to an internal section within the same document.

Likewise, one of ordinary skill in the art will appreciate that for brevity and clarity, token catalog 702 and document information index 712 are represented using a table/tabular format. One of ordinary skill in the art will appreciate that token catalogs and document information indices may be arranged differently using different formats, data structures, objects, columns, or the like, without departing from the scope of these innovations.

Generalized Operations

FIGS. 8-11 represent the generalized operations for indexing encoded documents in accordance with at least one of the various embodiments. In one or more of the various embodiments, processes 800, 900, 1000, and 1100 described in conjunction with FIGS. 8-11 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, one or more of the various embodiments, the processes described in conjunction with FIGS. 8-11 may be for indexing encoded documents such as described in conjunction with FIGS. 4-7.

Figure 8:
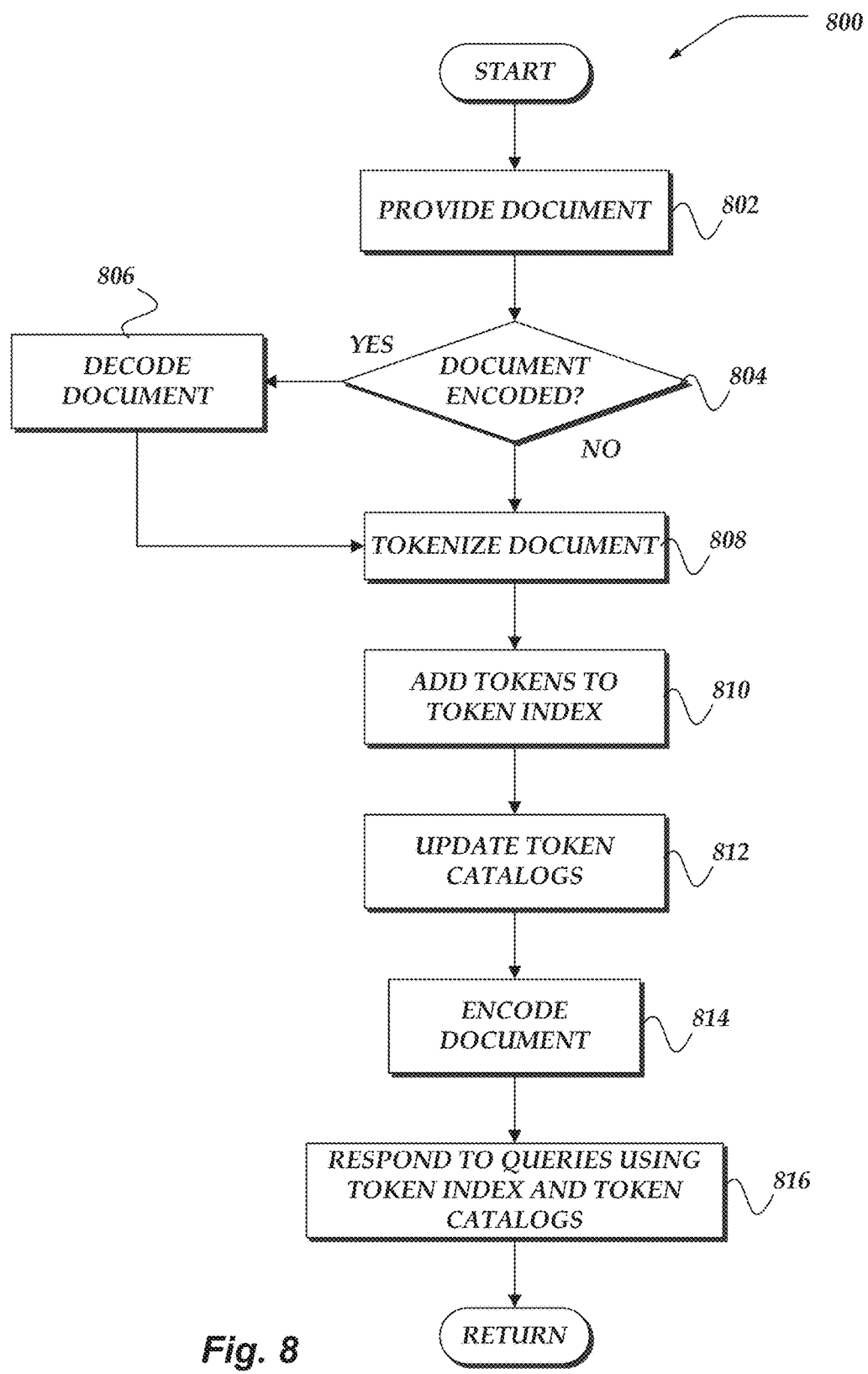
FIG. 8 illustrates an overview flowchart for a process for indexing encoded documents in accordance with one or more of the various embodiments.

FIG. 8 illustrates an overview flowchart for process 800 for indexing encoded documents in accordance with one or more of the various embodiments. After a start block, at block 802, in one or more of the various embodiments, one or more documents may be provided to an indexing engine, such as, indexing engine 326. Documents may be read from file systems, passed by reference, passed by value, or the like. Generally, a client application may provide the document data or a reference to document to the indexing engine via an API or library interface.

At decision block 804, in one or more of the various embodiments, if the one or more documents are encoded, control may flow block 806; otherwise, control may flow to block 808. In one or more of the various embodiments, the indexing engine may be arranged to examine the document data to determine if it encoded. In some embodiments, the indexing engine may determine if the document is encoded by scanning the documents, looking for indicated in the documents header or meta-data, looking for specific header signatures, metadata in the documents, or the like. Also, in some embodiments, the client application that provides the document may indicate that the document is encoded. For example, the API used to initiate indexing may provide for one or more parameters that enable the client to indicate if the document is encoded.

At block 806, in one or more of the various embodiments, the encoded documents may be decoded. In one or more of the various embodiments, a decoding engine, such as decoding engine 324 may be arranged to decode the document. Next, control may flow to block 808. In one or more of the various embodiments, indexing engine may be able to determine or infer how the document has been encoded based on the contents of the documents. Also, in one or more of the various embodiments, the client may provide information or meta-data indicating the type of decoder required to decode the document. In some embodiments, the indexing engine may reject the document or otherwise raise an error if the document requires a decoder or cipher suite that is unavailable.

In one or more of the various embodiments, the decoding engine may be arranged to decode the encoded documents in memory while maintaining the original encoded documents. Accordingly, the original encoded documents may be preserved rather than re-encoded later.

Also, in other embodiments, the decoding and indexing of the documents may occur in streaming mode. Accordingly, the documents can be decoded in chunks, and each data chunk may be provided to the index engine without waiting for the entire document to be decoded.

At block 808, in one or more of the various embodiments, the one or more documents may be provided to a tokenizer. In one or more of the various embodiments, the tokenizer may be arranged to parse the documents looking for tokens and token information. In some embodiments, tokens may be words, strings, data blocks, or the like. The universe of potential tokens may be limited or shaped using configuration information such as exclusion lists, inclusion lists, language models, or the like. In some embodiments, the tokenizer may be an application, library or process, such as a program generated using Lex and YACC, or the like.

At block 810, in one or more of the various embodiments, the tokens discovered from the one or more documents may be added to the token index. Note, in one or more of the various embodiments, one or more tokens may already be included in the token index. Accordingly, previously seen tokens will not be added to the token index, except for updating the token information in the token catalogs as mentioned below.

In one or more of the various embodiments, the token index may be arranged to include a reference or pointer to a given token's corresponding token catalog. Thus, if a token match is found, the token's corresponding token catalog may be provided.

At block 812, in one or more of the various embodiments, one or more token catalogs may be updated. In one or more of the various embodiments, each unique token has a corresponding token catalog. Thus, in some embodiments, if a token has been previously seen, there may be an existing token catalog where the token information for a document may be appended. Otherwise, in one or more of the various embodiments, a token catalog for new tokens may be generated and the token information may be stored within.

Also, in one or more of the various embodiments, token catalogs may be encoded for security or data optimization. Accordingly, if the token catalogs are encoded they may be decoded as needed.

At block 814, in one or more of the various embodiments, the encoding engine may encode the one or more documents. In one or more of the various embodiments, if the tokens and token information has been discovered and added to the token index and their respective token catalogs, the encoding engine may be employed to encode the document. In some embodiments, if a document is encoded it may be stored in an appropriate location. In one or more of the various embodiments, the client that may be providing the documents for indexing may provide a storage destination for storing the encoded documents. In some embodiments, the indexing engine may be arranged to employ configuration information to determine where the encoded documents should be stored.

In one or more of the various embodiments, if the document was originally encoded, the original encoded document may be used rather than encoding the in-memory decoded version.

Accordingly, in some embodiments, the encoded document may be stored appropriately by the indexing engine and the in-memory decoded version of the document may be discarded.

In one or more of the various embodiments, the encoding engine may be arranged to encode originally encoded documents using a different encoding that is different than the encoding used to originally encode the document. Accordingly, in one or more of the various embodiments, the encoding engine may be arranged to employ encodings that have different characteristics than the original encoding. In some embodiments, such characteristics may include, encryption strength, compression, selected cipher suites, memory use, computational efficiency, key types, key lengths, or the like.

In one or more of the various embodiments, some documents may be indexed even though they are not encoded. In one or more of the various embodiments, the indexing engine may be arranged to index one or more documents that may be omitted from encoding. In one or more of the various embodiments, the client may be enabled to provide one or more parameters or meta-data that indicate that one or more documents should be omitted from encoding. However, in some embodiments, the one or more documents that are not encoded may be indexed just the same as the documents that are intended to be encoded.

As mentioned above, the encoding engine may be arranged to incorporate signals provided by sensors 364 or HSM 360 for generating optimized or improved entropy that may be used for encoding the documents. For example, in one or more of the various embodiments, an encoding engine, such as, encoding engine 322 may be arranged to collect one or more signals used for generating entropy that may be used for generating random numbers (e.g., random number seeds) that may be used for encryption or secure key generation.

At block 816, in one or more of the various embodiments, the search engine may respond to queries. In one or more of the various embodiments, a search engine, such as search engine 327 may be arranged to employ the token index and the token catalogs to respond to the queries. In one or more of the various embodiments, clients may provide queries to the search engine that may be executed against the index documents.

Next, in one or more of the various embodiments, control may be returned to a calling process.

Figure 9:
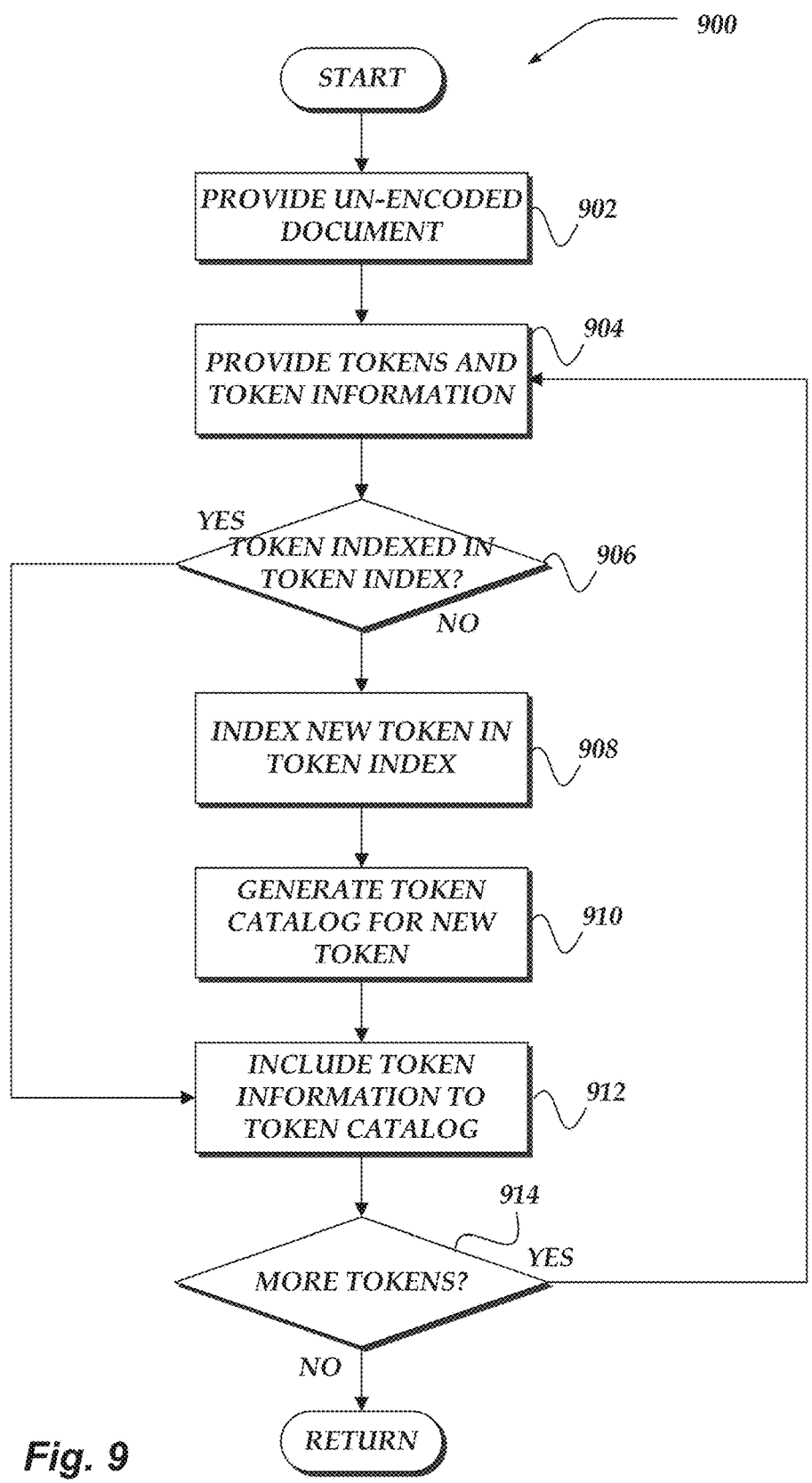
FIG. 9 illustrates a flowchart for a process for tokenizing documents for indexing encoded documents in accordance with one or more of the various embodiments.

FIG. 9 illustrates a flowchart for process 900 for tokenizing documents for indexing encoded documents in accordance with one or more of the various embodiments. After a start block, at block 902, in one or more of the various embodiments, one or more un-encoded or non-encoded documents may be provided to an indexing engine, such as, indexing engine 326. In one or more of the various embodiments, if the document was previously encoded, it should be decoded before providing it to process 900.

At block 904, in one or more of the various embodiments, one or more tokens and their respective token information may be provided. In one or more of the various embodiments, the indexing engine may include a tokenizer or in some embodiments it may employ an external tokenizing engine to parse the document and discover the included tokens. In one or more of the various embodiments, the tokenizer may provide a set of tokens with token information. The token information may include metrics associated with a given token with respect to the document it was found within. Metrics may include counts, distribution information, frequency information, or the like, Also, the token information may include position information that indicates the location of the token within the document. If a token was found in the document multiple times, there may be more than one position for a token.

At decision block 906, in one or more of the various embodiments, if the token is in the token index, control may flow block 912; otherwise, control may flow to block 908. In one or more of the various embodiments, the indexing engine may traverse token index to discover if a token is included in the index.

In one or more of the various embodiments, if the token index is a trie index, the indexing engine may be arranged to scan the trie index one token element at a time, such that if the first element is found in the first level of the trie index, the next element of the token is compared against the next level of the trie index, and so on, until an element fails to match or the token is matched.

At block 908, in one or more of the various embodiments, since the token is not included in the current token index, the token index may be extended or updated to include the token. In one or more of the various embodiments, the indexing engine may be arranged to add an entry to the index that matches the token.

In one or more of the various embodiments, if the token index is represented by a trie index, the unmatched token elements of the token may be inserted into the trie. In a trie index some of the token elements may be shared with other tokens. In some cases, the trie index may be extended by adding/inserting a token element into the level of the trie the failed to match. For example, if the top level of the trie index includes token elements A and I, adding the token TOWN will require the token element T to be added to the first level of the trie. This operation repeats for each token element not seen in the index for a given level corresponding the element's position in the token. For example, the second element of the token THE is H, if there is an H at the trie's second level (layer) it may be shared with other tokens that have a token element of H at their second position.

For example, referring to trie index 602, for token THE, its third token element E is present in trie index 602. However, after the third element, token THE is completely represented, so a termination indicator that includes or references the token catalog for the token THE may be inserted in the index. Note, for a token index implemented using an array, the token catalog reference may be included in a data structure stored in the array element corresponding to the token element E shown at row 622 column 628 of index 616.

At block 910, in one or more of the various embodiments, a new token catalog may be generated for the new token. In one or more of the various embodiments, the indexing engine may be arranged to instantiate and provide a new token catalog that corresponds to the newly indexed token.

At block 912, in one or more of the various embodiments, the token information corresponding to the token being processed may be added to its corresponding token catalog. In one or more of the various embodiments, as mentioned above, token information may include various data such as, document identifier, token count, un-encoded document positions, encoded document positions, or the like. Each entry or record in the token catalog may correspond to a single document. Thus, for example, in one or more of the various embodiments, if ten indexed documents include the token HELLO, the token catalog for token HELLO will include at least ten records—one for each indexed document that includes the token HELLO.

At decision block 914, in one or more of the various embodiments, if there are more tokens to process, control may loop back to block 904; otherwise, control may be returned to a calling process. In one or more of the various embodiments, the indexing engine may be arranged to attempt to index each token discovered in a document. Accordingly, in one or more of the various embodiments, process 900 may run until all the discovered tokens have been checked to see if they are included in the token index.

Figure 10:
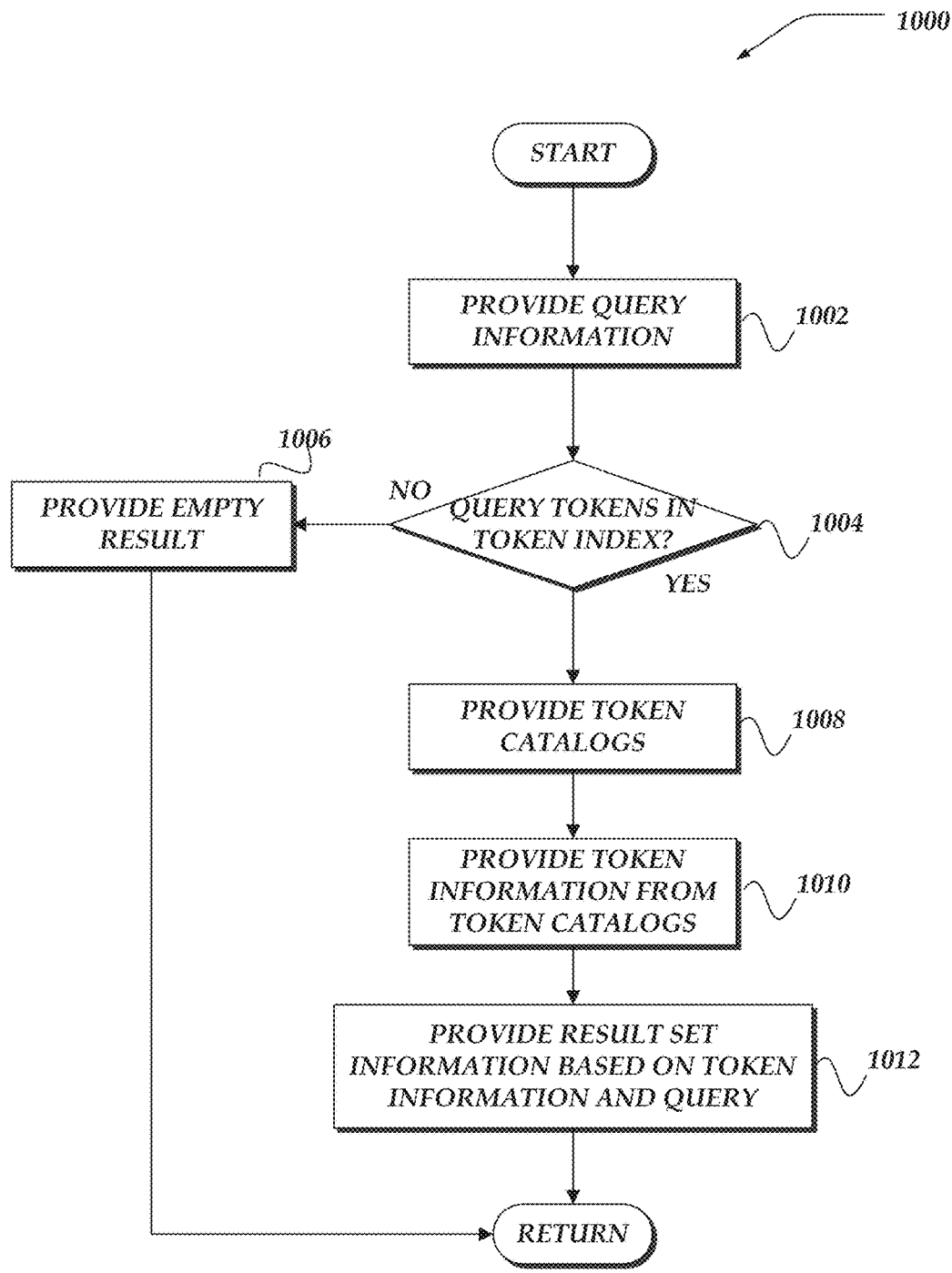
FIG. 10 illustrates a flowchart for a process for searching encoded documents that have been indexed in accordance with one or more of the various embodiments.

FIG. 10 illustrates a flowchart for process 1000 for searching encoded documents that have been indexed in accordance with one or more of the various embodiments. After a start block, at block 1002, in one or more of the various embodiments, query information may be provided. In one or more of the various embodiments, a search engine, such as search engine 327 may be arranged to accept query information that includes one or more query expressions. In some embodiments, the query information may be processed or arranged into one or more sub-queries that may be employed by the search engine.

At decision block 1004, in one or more of the various embodiments, if tokens included in the query information are discovered in the token index, control may flow to block 1008; otherwise, control may flow to block 1006. For example, if a query may be searching for the documents that include the token TOWN, the search engine first checks the token index to determine if any indexed documents include the token TOWN. Accordingly, if a trie index, such as index 602 is used, it will include each token included in the indexed documents. Note, in some embodiments, depending on the token exclusion and token inclusion rules used by the indexing engine, some query values that appear to include common or expected tokens may be unmatched even if they were present in indexed documents. This is because the indexing engine may be arranged to discard some potential tokens rather than to index them.

In one or more of the various embodiments, the search engine may be arbitrarily arranged to organically support more complex queries, including prefix searches, boolean combinations, nearness in position (for searching phrases), nearness in lexigraphy (for searching for tokens having similar meaning), order of operations (e.g., parentheses), sorting, grouping, arithmetic comparisons, ranges, functions (e.g., sums, products, mean, medians, or the like), stored procedures, or the like, or combinations thereof. In one or more of the various embodiments, depending on the query, one or more partial queries may be performed to produce partial result sets that may be combined. In one or more of the various embodiments, a query pre-processor or query planner engine may be employed to provide a query that is formatted or optimized for the search engine.

At block 1006, in one or more of the various embodiments, since the query did not discover a token hit in the token index, empty results may be provided to the client that submitted the query information. Next, control may be returned to a calling process.

At block 1008, in one or more of the various embodiments, one or more token catalogs corresponding to the matched tokens may be provided. In one or more of the various embodiments, the search engine may be arranged to obtain the token catalog identifiers for each query token found in the index. For example, for a single token query, such as token TOWN. The token catalog that corresponds to token TOWN may be provided. Similarly, for example, if the query was trying to find documents that include token TOWN and token TAVERN, the search engine may provide two token catalogs, one for token TOWN and another for token TAVERN.

Also, in one or more of the various embodiments, token catalogs may be encoded for security or data optimization. Accordingly, if the token catalogs are encoded they may be decoded as needed.

At block 1010, in one or more of the various embodiments, the token information may be provided. In one or more of the various embodiments, the token information included in the one or more token catalogs may be provided.

At block 1012, in one or more of the various embodiments, a result set may be provided based on the token information and the query information. In one or more of the various embodiments, the search engine may be arranged to perform one or more actions to generate a result set.

For example, in one or more of the various embodiments, if the query is requesting a list of all documents that include token TOWN, the result set may simply include each document included in the token catalog for token TOWN. However, in another example, the query may include an expression arranged to include documents that contain a threshold number of instances of the token (e.g., 5 or more). Accordingly, in this example, the search engine may be arranged to evaluate the token information for each document referenced in the token catalog, excluding those where the token information indicates that the token appears less times than the threshold value and including those where the token information indicates that the token appears enough times to meet the threshold requirement.

In one or more of the various embodiments, if the query includes Boolean operations, such as, SELECT documents THAT INCLUDE token TOWN AND token TAVERN, the search engine may be arranged to perform post-processing to include documents that are simultaneously referenced in both of the token catalog for token TOWN and the token catalog for token TAVERN.

In one or more of the various embodiments, the search engine or the client that provides the query information may be communicating over a network with unstable network quality. Accordingly, in one or more of the various embodiments, to optimize performance, reliability, and stability, the search engine may be arranged to include one or more memories that may be used for caching the result set information as needed.

Accordingly, in one or more of the various embodiments, the search engine may be arranged to adapt how result information may be provided based on the quality or availability of network connectivity with the client that provided the query request. In one or more of the various embodiments, if the available network quality, based on band-width, throughput, congestion, stability, or the like, drops below a configured threshold, the search engine may temporarily cache the result set information in memory until the network quality is restored back to the required threshold. In some embodiments, if the network quality is restored the search engine may be arranged to send the cached result set information to its intended destination.

One of ordinary skill in the art will appreciate that a search engine may be arranged to support an almost arbitrary number of different types of queries. And, that an external post-processor may apply further processing to conform results to a given query. Accordingly, in the interest of brevity and clarity further examples are omitted. However, the examples or embodiments disclosed herein are sufficient to describe and disclose these innovations at least to one of ordinary skill in the art.

Figure 11:
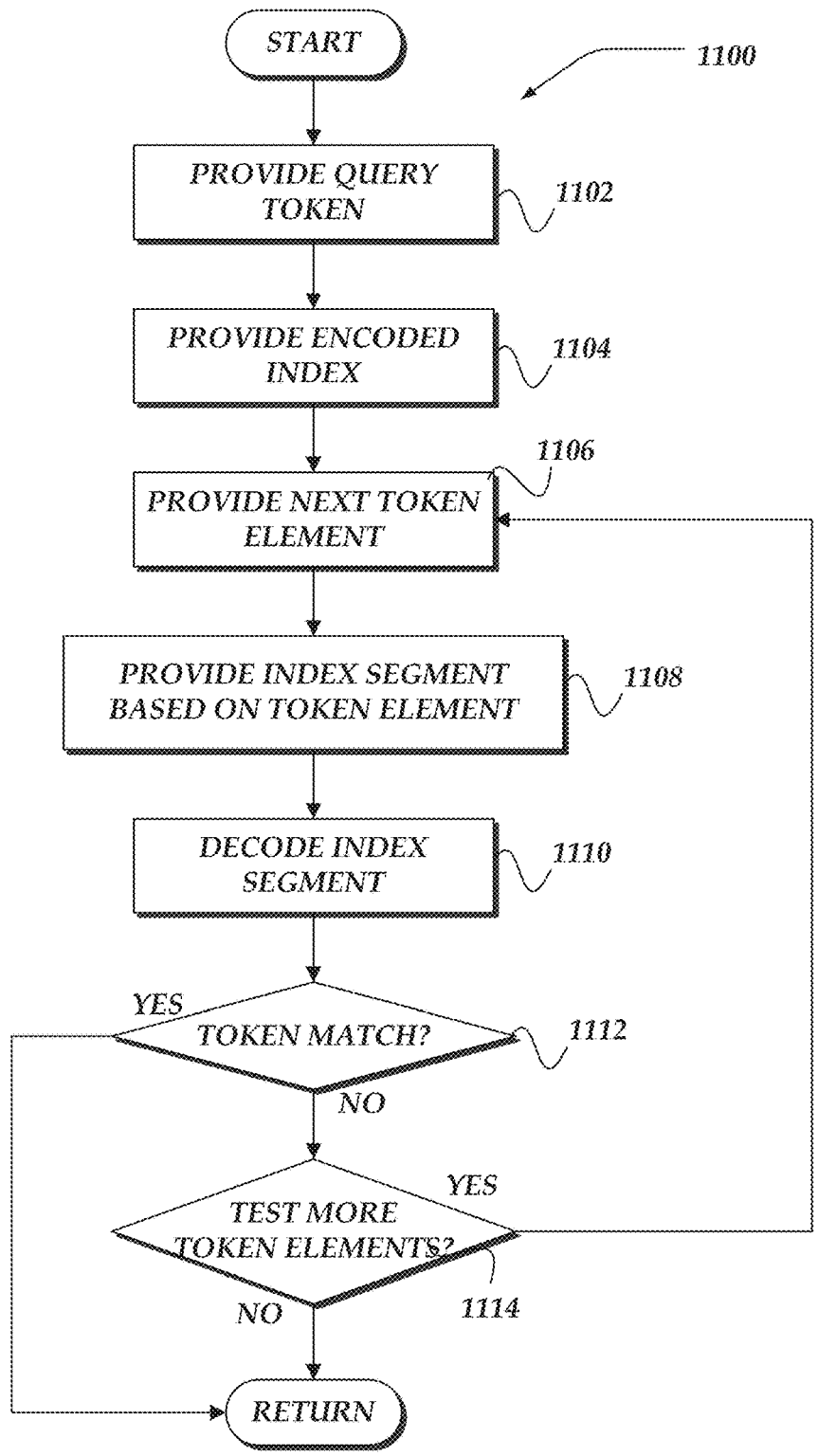
FIG. 11 illustrates a flowchart for a process for searching encoded documents that have been indexed and where the token index is encoded in accordance with one or more of the various embodiments.

FIG. 11 illustrates a flowchart for process 1100 for searching encoded documents that have been indexed and where the token index is encoded in accordance with one or more of the various embodiments. After a start block, at block 1102, in one or more of the various embodiments, a query token may be provided to a search engine.

At block 1104, in one or more of the various embodiments, an encoded token index may be provided. The particular token index may be identified based on the configuration information associated with the document collection, the client, other user, or the like. In one or more of the various embodiments, token indices may be encoded to compress or encrypt the contents of the indices. Accordingly, user with unauthorized access may be prevented from discovering information about the contents of the indexed documents.

At block 1106, in one or more of the various embodiments, the next token element may be provided. In one or more of the various embodiments, as described above the search engine may be arranged to compare one token element at a time to the token index. Accordingly, starting with the first token element, the search engine may test to see if the token element is in the index. If the first token element is found in the token index, the process will repeat using next token element, until the token is determined to be absent from the index or there is a match.

At block 1108, in one or more of the various embodiments, an encoded segment may be provided from the encoded token index based on the token element currently being checked. In one or more of the various embodiments, the search engine or an indexing engine may be arranged to compute the portion of the encoded index that may include the token element or if the token element is not present the location of the 'empty' cell may be computed. In one or more of the various embodiments, the length of the encoded segment may be selected to match the length of the encrypted blocks used by the cipher when encoding or decoding the token indices.

In one or more of the various embodiments, the location may be determined because the indexing engine and search engine may be configured to support a particular token element alphabet that has a known count and known order.

Accordingly, during the creation of the token index, memory or storage space may be allocated for each complete level (row) of the token index. At initialization time, all the positions or cells may be set to empty. As the index fills up, the positions in the index data structure are set accordingly.

In one or more of the various embodiments, if the token index is encoded, a cipher suite that supports random access may be used to encrypt each cell of the token index. Thus, if the relative position for a given token element in the encrypted token index is known or can be computed, the position or segment may be retrieved.

For example, referring to token index 616 in FIG. 6, if the token element being checked for is the second token element of a token and it is the $10^{th}$ element of the alphabet being used, the starting position of the relevant cell may be computed as follows:

Number of Items in Alphabet*Level+Alphabet position*encoded cell-size where, Level is the element position in the token being considered which corresponds to the level in a trie index or the row of index 616. Also, for this example, the array is considered to be arranged in contiguous memory such that the first cell of the second row comes after directly the last cell of the first row in memory, and so on.

Accordingly, assuming zero based counting, a 40 element alphabet, and 16 byte-wide encrypted cells, the position of the encoded segment corresponding to token element A at the first position of row 620 would be:

(40*1)+(0*16)=40 bytes

Likewise, the position for token element E in row 622 of array 616 may be computed as follows:

(40*2)+(4*16)=144 bytes

In one or more of the various embodiments, different formulas may be employed depending on the configuration of the token index and the type of encryption employed. However, in any case, the search engine or indexing engine are may be pre-arranged or pre-configured to know the cipher suite or compression encoding used to encode the token index, the encoded cell/element size, the number of elements in the alphabet being used, and the memory layout of the encoded token index. Thus, in one or more of the various embodiments, the encoded segment of the encoded token index may be determined.

At block 1110, in one or more of the various embodiments, the encoded segment may be decoded. In one or more of the various embodiments, the search engine or indexing engine may be arranged to decode the encoded index segment to read the information at the cell position. This information may be included if the token element being looked for is at the particular cell position. Note, in some embodiments, the position of the cell in the token index may infer the token element value, so a flag or marker may be used to indicate that the token element is included in the index rather than the token element value itself.

In one or more of the various embodiments, the decoded element information may include a pointer to a token catalog if the cell corresponds to a token match.

At decision block 1112, in one or more of the various embodiments, if the token is matched, control may be returned to a calling process; otherwise, control may flow to decision block 1114. In one or more of the various embodiments, as described above, the token may be determined to match if all of its token elements are matched.

At decision block 1114, in one or more of the various embodiments, if more token elements should be tested, control may loop back to block 1106; otherwise, control may be returned to a calling process.

In one or more of the various embodiments, the process may continue if there remain more token elements of the token that can be tested. If there is no match and all of the token elements have been tested, the token may be considered to be absent from the token index.

Likewise, in one or more of the various embodiments, if a token element is not found in the level or row that corresponds to its position in the token, the token may be considered to be absent from the token index.

In one or more of the various embodiments, the token index may be completely decoded before using and then encoded if it is not in use. Also, in one or more of the various embodiments, token catalogs may be encoded as well. Accordingly, if token catalogs are encoded they may be decoded as needed.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for managing documents over a network using one or more processors of a network computer to execute instructions that perform actions, comprising:
   employing an indexing engine to perform further actions on a provided document that is encoded or unencoded, including:

when the provided document is encoded, unencoding the document;
provefore a plurality of tokens included in the document based on content of the unencoded document employed to identify the plurality of tokens;
providing one or more tokens of the plurality of tokens that are absent from a token index;
indexing the one or more tokens in the token index;
providing token information based on the plurality of tokens and the document, wherein the token information includes one or more values that indicate each position of the plurality of tokens included in the document;
adding the token information to one or more token catalogs, wherein each token catalog is associated with a separate token from the plurality of tokens, and wherein a first encoding is employed to encode each token catalog;
providing mapping information that maps one or more document identifiers included in each of the one or more token catalogs to one or more documents, wherein the mapping information is stored separate from the one or more token catalogs; and
employing a second encoding to encode the unencoded document and storing the encoded document in a data store, wherein the first encoding is different than the second encoding; and
providing a result set to a user that is responsive to a query using the token index and the one or more token catalogs instead of the provided document; and
employing a flow execution engine to perform further actions, including:
employing a global positioning systems (GPS) device to provide geolocation information that is used to modify a visual display for one or more of a user interface, a report, or a database by modifying the display based on a physical location of a client computer employed by the user, wherein the modification of the display includes selecting one or more of time zone, currency, calendar format, or language that is presented to the user in the modified display.

2. The method of claim 1, wherein providing the result set further comprises:
providing one or more query tokens based on the query;
individually comparing the one or more query tokens to the token index based on one or more token elements of the one or more query tokens;
providing an affirmative result for each of the provided query tokens indexed by the token index;
providing one or more of the token catalogs based on the affirmative results of the comparison, wherein the one or more provided token catalogs correspond to a query token that is indexed by the token index;
providing token information from the one or more provided token catalogs based on the affirmative result of the comparison; and
providing the result set based on the token information, wherein the result set includes one or more lists of documents.

3. The method of claim 1, wherein indexing the one or more tokens, further comprises:
providing one or more token elements from each of the one or more tokens;
adding the one or more token elements to a portion of the token index that corresponds to the one or more token elements; and
providing a token catalog that corresponds to each of the one or more tokens added to the token index.

4. The method of claim 1, further comprising:
providing a token element set;
providing a trie that is arranged based on the token element set; and
providing the token index based on the trie.

5. The method of claim 1, wherein providing the token information, further comprises, including, one or more of, a document identifier, a count of a number of times an individual token appears in a particular document, or position values that correspond to each of a same token that is included in the document multiple times.

6. The method of claim 1, wherein providing the query further comprises, providing, one or more of, one or more query tokens, one or more logical operators, one or more precedence operators, one or more sorting directives, or one or more grouping directives.

7. The method of claim 1, further comprising, providing the document using a stream of data, wherein, partial portions of the documents are provided to the indexing engine in sequential order.

8. A system for managing documents over a network, comprising:
a network computer, comprising:
a memory that stores at least instructions; and
one or more processor devices that executes the instructions to perform actions, including:
employing an indexing engine to perform further actions on a provided document that is encoded or unencoded, including:
when the provided document is encoded, unencoding the document;
providing a plurality of tokens included in the document based on employing content of the unencoded document to identify the plurality of tokens;
providing one or more tokens of the plurality of tokens that are absent from a token index;
indexing the one or more tokens in the token index; providing token information based on the plurality of tokens and the document, wherein the token information includes one or more values that indicate each position of the plurality of tokens included in the document;
adding the token information to one or more token catalogs, wherein each token catalog is associated with a separate token from the plurality of tokens, and wherein a first encoding is employed to encode each token catalog;
providing mapping information that maps one or more document identifiers included in each of the one or more token catalogs to one or more documents, wherein the mapping information is stored separate from the one or more token catalogs; and
employing a second encoding to encode the unencoded document and storing the encoded document in a data store, wherein the first encoding is different than the second encoding; and
providing a result set to a user that is responsive to a query using the token index and the one or more token catalogs instead of the provided document; and
employing a flow execution engine to perform further actions, including:

employing a global positioning systems (GPS) device to provide geolocation information that is used to modify a visual display for one or more of a user interface, a report, or a database by modifying the display based on a physical location of a client computer employed by the user, wherein the modification of the display includes selecting one or more of time zone, currency, calendar format, or language that is presented to the user in the modified display; and the client computer, comprising:
a client computer memory that stores at least instructions; and
one or more processor devices that execute instructions that perform actions, including:
providing one or more of the documents or the query in the modified display.

9. The system of claim 8, wherein providing the result set further comprises:
providing one or more query tokens based on the query;
individually comparing the one or more query tokens to the token index based on one or more token elements of the one or more query tokens;
providing an affirmative result for each of the provided query tokens indexed by the token index;
providing one or more of the token catalogs based on the affirmative result of the comparison, wherein the one or more provided token catalogs correspond to a query token that is indexed by the token index;
providing token information from the one or more provided token catalogs based on the affirmative result of the comparison; and
providing the result set based on the token information, wherein the result set includes one or more lists of documents.

10. The system of claim 8, wherein indexing the one or more tokens, further comprises:
providing one or more token elements from each of the one or more tokens;
adding the one or more token elements to a portion of the token index that corresponds to the one or more token elements; and
providing a token catalog that corresponds to each of the one or more tokens added to the token index.

11. The system of claim 8, wherein the one or more network computer processor devices execute instructions that perform actions, further comprising:
providing a token element set;
providing a trie that is arranged based on the token element set; and
providing the token index based on the trie.

12. The system of claim 8, wherein providing the token information, further comprises, including, one or more of, a document identifier, a count of a number of times an individual token appears in a particular document, or position values that correspond to each of a same token that is included in the document multiple times.

13. The system of claim 8, wherein providing the query further comprises, providing, one or more of, one or more query tokens, one or more logical operators, one or more precedence operators, one or more sorting directives, or one or more grouping directives.

14. The system of claim 8, further comprising, employing the encoding engine to encode the token index and to encode the one or more token catalogs, wherein the encoding engine is employed to decode token index and to decode the one or more token catalogs to process the query and to provide the result set.

15. A processor readable non-transitory storage media that includes instructions for managing documents over a network, wherein execution of the instructions by one or more hardware processors performs actions, comprising:
employing an indexing engine to perform further actions on a provided document that is encoded or unencoded, including:
when the provided document is encoded, unencoding the document;
providing a plurality of tokens included in the document based on employing content of the unencoded document to identify the plurality of tokens;
providing one or more tokens of the plurality of tokens that are absent from a token index;
indexing the one or more tokens in the token index;
providing token information based on the plurality of tokens and the document, wherein the token information includes one or more values that indicate each position of the plurality of tokens included in the document;
adding the token information to one or more token catalogs, wherein each token catalog is associated with a separate token from the plurality of tokens, and wherein a first encoding is employed to encode each token catalog;
providing mapping information that maps one or more document identifiers included in each of the one or more token catalogs to one or more documents, wherein the mapping information is stored separate from the one or more token catalogs; and
employing a second encoding to encode the unencoded document and storing the encoded document in a data store, wherein the first encoding is different than the second encoding; and
providing a result set to a user that is responsive to a query using the token index and the one or more token catalogs instead of the provided document; and
employing a flow execution engine to perform further actions, including:
employing a global positioning systems (GPS) device to provide geolocation information that is used to modify a visual display for one or more of a user interface, a report, or a database by modifying the display based on a physical location of a client computer employed by the user, wherein the modification of the display includes selecting one or more of time zone, currency, calendar format, or language that is presented to the user in the modified display.

16. The media of claim 15, wherein providing the result set further comprises:
providing one or more query tokens based on the query;
individually comparing the one or more query tokens to the token index based on one or more token elements of the one or more query tokens;
providing an affirmative result for each of the provided query tokens indexed by the token index;
providing one or more of the token catalogs based on the affirmative result of the comparison, wherein the one or more provided token catalogs correspond to a query token that is indexed by the token index;
providing token information from the one or more provided token catalogs based on the affirmative result of the comparison; and providing the result set based on the token information, wherein the result set includes one or more lists of documents.

17. The media of claim 15, wherein indexing the one or more tokens, further comprises:
providing one or more token elements from each of the one or more tokens;
adding the one or more token elements to a portion of the token index that corresponds to the one or more token elements; and
providing a token catalog that corresponds to each of the one or more tokens added to the token index.

18. The media of claim 15, further comprising:
providing a token element set;
providing a trie that is arranged based on the token element set; and
providing the token index based on the trie.

19. The media of claim 15, wherein providing the token information, further comprises, including, one or more of, a document identifier, a count of a number of times an individual token appears in a particular document, or position values that correspond to each of a same token that is included in the document multiple times.

20. The media of claim 15, wherein providing the query further comprises, providing, one or more of, one or more query tokens, one or more logical operators, one or more precedence operators, one or more sorting directives, or one or more grouping directives.

21. A network computer for managing documents over a network, comprising:
a memory that stores at least instructions; and
one or more processor devices that execute instructions that perform actions, including:
employing an indexing engine to perform further actions on a provided document that is encoded or unencoded, including:
when the provided document is encoded, unencoding the document;
providing a plurality of tokens included in the document based on employing content of the unencoded document to identify the plurality of tokens;
providing one or more tokens of the plurality of tokens that are absent from a token index;
indexing the one or more tokens in the token index;
providing token information based on the plurality of tokens and the document, wherein the token information includes one or more values that indicate each position of the plurality of tokens included in the document;
adding the token information to one or more token catalogs, wherein each token catalog is associated with a separate token from the plurality of tokens, and wherein a first encoding is employed to encode each token catalog;
providing mapping information that maps one or more document identifiers included in each of the one or more token catalogs to one or more documents, wherein the mapping information is stored separate from the one or more token catalogs; and
employing a second encoding to encode the unencoded document and storing the encoded document in a data store, wherein the first encoding is different than the second encoding; and
providing a result set to a user that is responsive to a query using the token index and the one or more token catalogs instead of the provided document; and
employing a flow execution engine to perform further actions, including:
employing a global positioning systems (GPS) device to provide geolocation information that is used to modify a visual display for one or more of a user interface, a report, or a database by modifying the display based on a physical location of a client computer employed by the user, wherein the modification of the display includes selecting one or more of time zone, currency, calendar format, or language that is presented to the user in the modified display.

22. The network computer of claim 21, wherein providing the result set further comprises:
providing one or more query tokens based on the query;
individually comparing the one or more query tokens to the token index based on one or more token elements of the one or more query tokens;
providing an affirmative result for each of the provided query tokens indexed by the token index;
providing one or more of the token catalogs based on the affirmative result of the comparison, wherein the one or more provided token catalogs correspond to a query token that is indexed by the token index;
providing token information from the one or more provided token catalogs based on the affirmative result of the comparison; and
providing the result set based on the token information, wherein the result set includes one or more lists of documents.

23. The network computer of claim 21, wherein indexing the one or more tokens, further comprises:
providing one or more token elements from each of the one or more tokens;
adding the one or more token elements to a portion of the token index that corresponds to the one or more token elements; and
providing a token catalog that corresponds to each of the one or more tokens added to the token index.

24. The network computer of claim 21, further comprising:
providing a token element set;
providing a trie that is arranged based on the token element set; and
providing the token index based on the trie.

25. The network computer of claim 21, wherein providing the token information, further comprises, including, one or more of, a document identifier, a count of a number of times an individual token appears in a particular document, or position values that correspond to each of a same token that is included in the document multiple times.

26. The network computer of claim 21, wherein providing the query further comprises, providing, one or more of, one or more query tokens, one or more logical operators, one or more precedence operators, one or more sorting directives, or one or more grouping directives.

* * * * *